W. L. FRIEDMAN.
MEANS FOR VIEWING PICTURES IN RELIEF.
APPLICATION FILED OCT. 21, 1916.
1,358,685.
Patented Nov. 9, 1920.
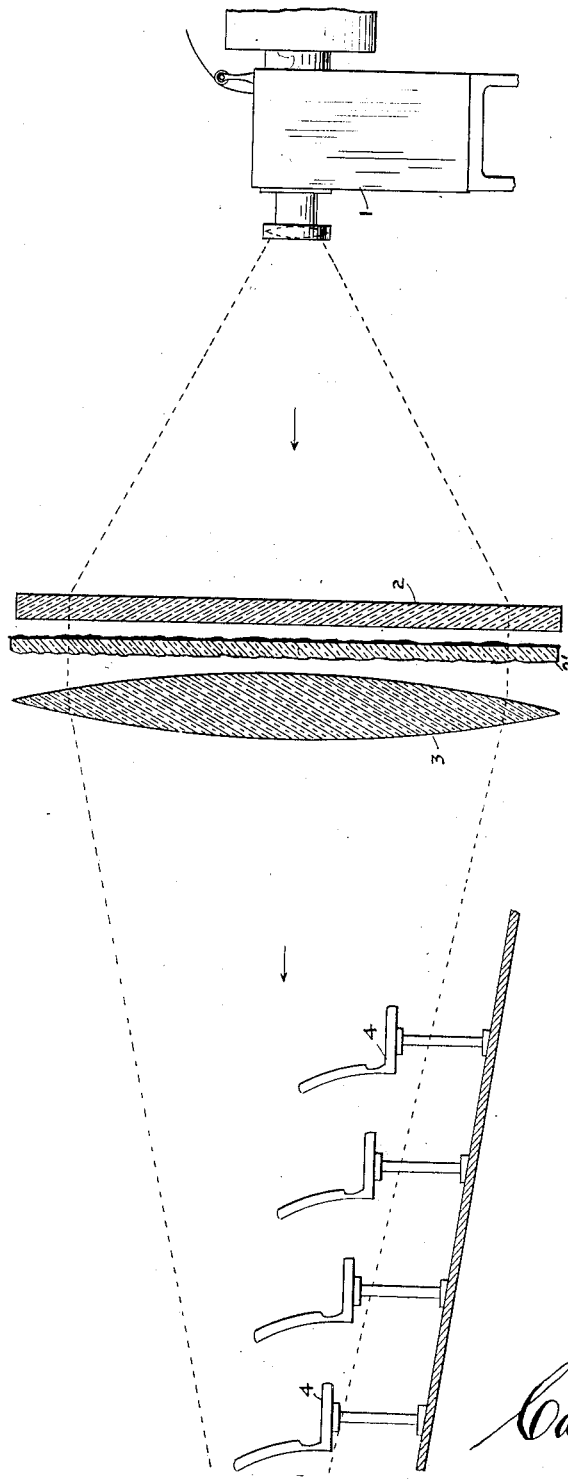
INVENTOR.
W. L. FRIEDMAN
BY
Carlos P. Griffin
ATTORNEY.

UNITED STATES PATENT OFFICE.

WILLIAM L. FRIEDMAN, OF OAKLAND, CALIFORNIA.

MEANS FOR VIEWING PICTURES IN RELIEF.

1,358,685.  Specification of Letters Patent.  Patented Nov. 9, 1920.

Application filed October 21, 1916. Serial No. 126,889.

*To all whom it may concern:*

Be it known that I, WILLIAM L. FRIEDMAN, a citizen of the United States, residing at Oakland, in the county of Alameda, State of California, have invented a new and useful Means for Viewing Pictures in Relief, of which the following is a specification, in such full and clear terms as will enable those skilled in the art to construct and use the same.

This invention relates to an apparatus for viewing pictures in relief a single picture being used in the place of the two pictures ordinarily shown in stereoscopes.

It will be understood by those skilled in optics that in the ordinary stereoscope the illusion of relief is given by providing a separate picture for each eye to view, but for projection apparatus this would not be possible since it would necessitate (in moving picture work for example) two sets of pictures on a film, or possibly two films. It therefore becomes necessary to so project a single picture as to give the illusion of relief notwithstanding the fact that both eyes view the picture at the same time and without a separating shield or screen.

Another object of the invention is to make possible the exhibition of pictures in a room which has not been darkened thereby avoiding the inconvenience of a dark theater.

Another object of the invention is to make it possible to build the moving picture operator's room at the back of the stage thereby avoiding the fire dangers ordinarily present when the operator's room is adjacent the rear of the theater close to the exits.

In carrying out the invention the light from the projection apparatus is directed on to or preferably through a suitable translucent screen upon which the picture is focused, and the picture is viewed by the audience through a lens or through a sheet of glass such as Venetian glass which has a minutely waved surface but through which the pictures can be seen.

The same effect of depth can be produced with other forms of refracting media such for example as by bending two sheets of glass and making them water tight at their edges and filling them with water or other clear liquid all of the optical effects of a lens can be produced, the refractive conditions being the same.

The precise position of the refracting screen with respect to the screen on which the picture is shown will depend on the size of the picture we wish to produce and the depth of relief desired. The placing and spacing of the refracting media from the screen is absolutely necessary to produce the relief effect, the distance depending upon the increase or decrease of the curvature, convexity or the depth and thickness of the refracting media.

Another advantage lies in the fact that the media may be suitably colored to make the viewing of the pictures easy upon the eyes.

The figure is a side elevation showing the screen and lens in section of my complete apparatus, in which the projecting apparatus directs its rays toward the observers.

While the term stereoscopic has been used herein it is to be understood that the principal object of the invention is to provide means whereby the illusion of perspective or relief of the picture viewed may be increased there being no attempt to supply a different picture for each eye as is common in some stereoscopes.

The numeral 1 indicates a suitable projection apparatus of any suitable character adapted to throw a picture on the screen 2 said screen being made of glass or other homogeneous translucent material of suitable density to give good definition to the picture shown. In front of the screen 2 there is placed a suitably curved or wavy glass screen, such glass as " Venetian " or " Cathedral " or " Moss " glass being used to give the necessary change in direction of the light rays to give the relief effect.

In front of the screen 2' there is placed a suitable large lens 3 through which the audience in the chairs 4 views the picture. The lens is of a suitably large curvature to prevent it from magnifying the picture too greatly and also to enable the picture to be seen therethrough with substantially no distortion, but with the effect of relief.

Another advantageous result of the foregoing construction is that it is unnecessary to have the lantern or exhibition apparatus at a considerable distance from the screen, and the screen may be much smaller than the ordinary screen for the reason that the lens will magnify the picture on a small screen to give the appearance of a picture much larger than it actually is.

The distance of the lenses or the auxiliary screens from the real screen on which the picture is shown is determined by trial to fit given conditions, but in any event it must not be great enough to blur the picture and must not be small enough to lose the relief effect.

Having thus described my invention what I claim as new and desire to secure by Letters Patent of the United States, is as follows:—

An apparatus for displaying pictures with the illusion of relief comprising a translucent screen upon which the pictures are projected, a light refraction screen positioned in front of the translucent screen and a lens positioned for viewing the picture on the first mentioned screen.

In testimony whereof I have hereunto set my hand this 13th day of October, A. D. 1916.

WILLIAM L. FRIEDMAN.